US012384156B2

(12) United States Patent
Kajihara

(10) Patent No.: US 12,384,156 B2
(45) Date of Patent: Aug. 12, 2025

(54) PRINTING APPARATUS

(71) Applicant: SCREEN HOLDINGS CO., LTD., Kyoto (JP)

(72) Inventor: Kaisei Kajihara, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 212 days.

(21) Appl. No.: 18/456,899

(22) Filed: Aug. 28, 2023

(65) Prior Publication Data

US 2024/0100834 A1 Mar. 28, 2024

(30) Foreign Application Priority Data

Sep. 22, 2022 (JP) ................................ 2022-151246

(51) Int. Cl.

*B41J 2/165* (2006.01)
*B41J 11/00* (2006.01)
*B41J 11/04* (2006.01)
*B41J 29/17* (2006.01)

(52) U.S. Cl.

CPC ....... *B41J 2/16541* (2013.01); *B41J 2/16508* (2013.01); *B41J 2/16547* (2013.01); *B41J 11/007* (2013.01); *B41J 11/04* (2013.01); *B41J 29/17* (2013.01); *B41J 2002/16582* (2013.01)

(58) Field of Classification Search

CPC .. B41J 2/16541; B41J 2/16508; B41J 11/007; B41J 11/04; B41J 29/17

See application file for complete search history.

(56) References Cited

U.S. PATENT DOCUMENTS

| | | | | |
|---|---|---|---|---|
| 9,517,629 | B2 * | 12/2016 | Kuno | B41J 2/16538 |
| 2016/0089888 | A1 * | 3/2016 | Kuno | B41J 2/16541 347/33 |
| 2021/0245513 | A1 | 8/2021 | Kashiwagi | |

FOREIGN PATENT DOCUMENTS

| | | | | |
|---|---|---|---|---|
| EP | 3862188 A2 * | 8/2021 | | B41J 2/16505 |
| JP | 2021-123038 A | 8/2021 | | |

* cited by examiner

*Primary Examiner* — Sharon Polk
(74) *Attorney, Agent, or Firm* — Rimon P.C.

(57) ABSTRACT

This invention aims to propose a structure excellent in the maintenance operability of a cleaning member in a printing apparatus provided with the cleaning member for cleaning at least one of a wiper and a cap. In a printing apparatus according to the invention, a cleaning member for cleaning a wiper or a cap of a maintenance part is integrated with a printing head in a relative movement between the printing head and the maintenance part and arranged to at least partially overlap a movement path of the object to be cleaned with respect to the printing head and moves to outside the conveyance path integrally with the printing head when the printing head is moved from the inside position to the outside position.

11 Claims, 12 Drawing Sheets

PRINTING APPARATUS

CROSS REFERENCE TO RELATED APPLICATION

The disclosure of Japanese Patent Application No. 2022-151246 filed on Sep. 22, 2022 including specification, drawings and claims is incorporated herein by reference in its entirety.

BACKGROUND OF THE INVENTION

1. Field of the Invention

This invention relates to a printing apparatus for printing by discharging an ink toward a surface of a base material being conveyed, particularly to maintenance for ink discharge head.

2. Description of the Related Art

For an ink discharge head for discharging an ink from nozzles, a cap is provided to cover the nozzles to prevent the clogging of the nozzles in a standby state. Further, a certain amount of the ink may be regularly discharged from the nozzles (purging). After the purging, the ink flowing out from the nozzles remains and adheres around the nozzles and the cap. Accordingly, wiping is performed to wipe off the ink from the head by a wiper. However, since this causes the ink to adhere to the wiper and the cap, a cleaning member for removing the ink by coming into contact with these may be further provided (see, for example, patent literature 1: JP2021-123038A).

Also in the cleaning member for cleaning by coming into contact with at least one of the wiper and the cap in this way, the accumulation of stains caused by the transfer of the ink from the wiper and the cap and wear deterioration caused by rubbing against these possibly become problematic. Accordingly, regular maintenance (maintenance operation) by an operator such as cleaning and component replacement becomes necessary. Thus, it is desirable to ensure excellent maintainability also for the cleaning member, similarly to each of other apparatus components. However, the structure and arrangement of each member in the apparatus are not specifically described in patent literature 1, and it cannot be said that maintenance operability is sufficiently considered.

SUMMARY OF INVENTION

This invention was developed in view of the above problem and aims to propose a structure excellent in the maintenance operability of a cleaning member in a printing apparatus provided with the cleaning member for cleaning at least one of a wiper and a cap.

The invention is directed to a printing apparatus with a conveying mechanism for conveying a base material, a printing head arranged above the base material being conveyed in a first direction along a predetermined conveyance path by the conveying mechanism to face a surface of the base material from above, the printing head discharging an ink toward the surface of the base material from a discharge port provided in a lower part, a supporting mechanism for supporting the printing head movably in a second direction which is horizontal and intersecting the first direction, a maintenance part provided below the printing head, the maintenance part including a wiper for wiping off the ink adhering to the discharge port and a cap for covering the discharge port, a housing for accommodating the printing head and at least a part of the conveying mechanism in an internal space, a relative moving mechanism for relatively moving the maintenance part in a horizontal direction with respect to the printing head along a lower surface of the printing head in the internal space, thereby realizing a contact of the wiper with the discharge port and positioning of the cap with respect to the discharge port, and a cleaning member for cleaning at least one of an upper end of the wiper and an upper end of the cap as an object to be cleaned.

A movable range in the second direction of the printing head by the supporting mechanism includes an inside position where the printing head is located above the base material in the internal space and an outside position where at least a part of the printing head is exposed to outside from the internal space. Further, the cleaning member is integrated with the printing head in a relative movement by the relative moving mechanism and arranged to at least partially overlap a movement path of the object to be cleaned with respect to the printing head, and moves to outside the conveyance path integrally with the printing head when the printing head is moved from the inside position to the outside position.

In the invention thus configured, the periphery of the discharge port of the printing head can be maintained clean and a measure for preventing clogging can be taken if necessary by relatively moving the maintenance part including the wiper and the cap with respect to the printing head. The ink adhering to the wiper or cap is removed by the cleaning member integrated with the printing head in the relative movement with respect to the maintenance part. That is, when the maintenance part relatively moves with respect to the printing head, the maintenance part relatively moves also with respect to the cleaning member. Since the cleaning member is present on the movement path of the object to be cleaned (upper end of the wiper or cap) in this movement, the cleaning of the object to be cleaned is realized by this relative movement.

Further, the printing head can be pulled out to the outside position exposed from the inside of the housing. In this way, the operability of a maintenance operation for the printing head is improved. At this time, the cleaning member is also pulled out further outward than the conveyance path. Therefore, access to the cleaning member is facilitated, similarly to access to the printing head. In this way, the operability of the maintenance operation for the cleaning member is improved.

As described above, according to the invention, the cleaning of the wiper or cap by the cleaning member is realized, together with the cleaning of the printing head by the wiper, by a relative movement of the printing head and the maintenance part. The cleaning member moves together with the printing head and is pulled out to the outside of the conveyance path of the base material when the printing head is pulled out to the outside of the housing. Thus, access to the cleaning member from outside is facilitated and the operability of the maintenance operation can be improved.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
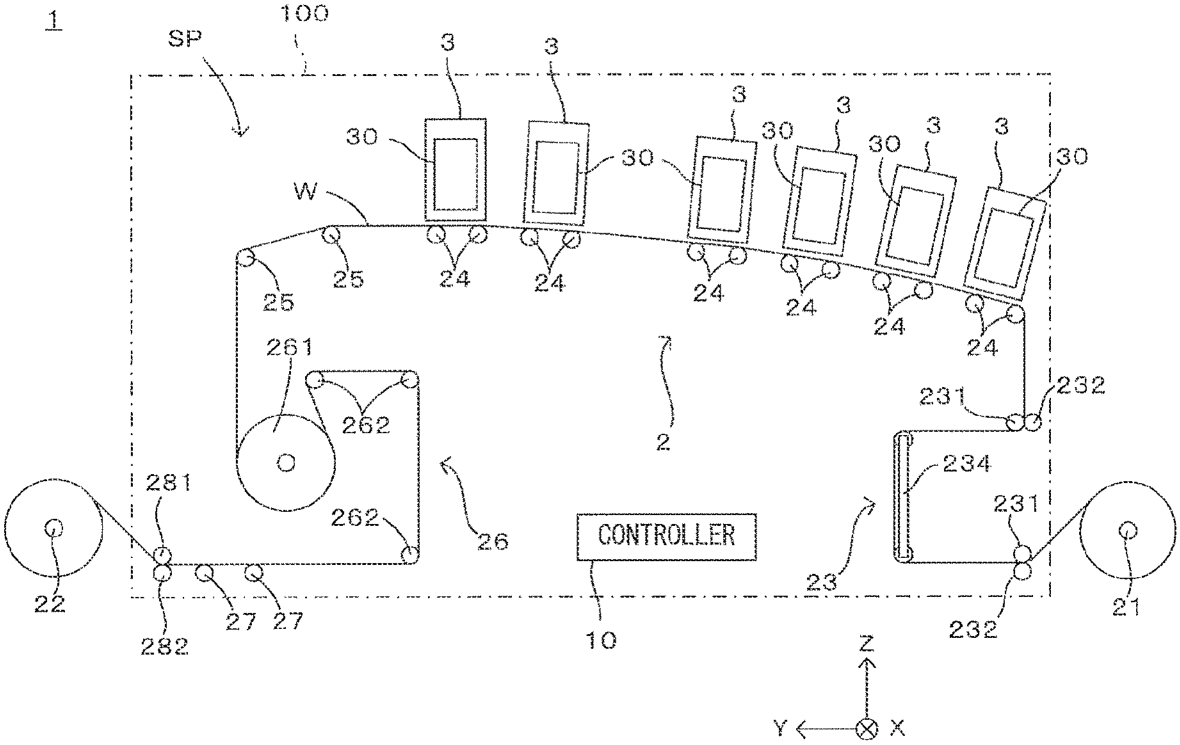
FIG. 1 is a front view schematically showing an example of a printing apparatus according to the invention.

FIG. 1 is a front view schematically showing an example of a printing apparatus according to the invention. In FIG. 1 and subsequent figures, an X direction, which is a horizontal direction, a Y direction, which is a horizontal direction orthogonal to the X direction, and a Z direction, which is a vertical direction, are shown as appropriate. The printing apparatus 1 prints images on a web W (base material) by discharging inks to the web W in an ink-jet method while conveying the web W which has a form of an elongated strip in a roll-to-roll manner in a housing 100. A material of the web W is paper or film and the web W is flexible. The printing apparatus 1 is provided with a controller 10 that integrally controls the entire apparatus, and a control required to print images on the web W is executed by the controller 10. This controller 10 is constituted with a processor such as a CPU (Central Processing Unit).

The printing apparatus 1 includes a conveyor 2 that conveys the web W. The conveyor 2 includes a feeding roller 21 and a take-up roller 22, and the web W is conveyed in a roll-to-roll manner by the take-up roller 22 taking up the web W fed by the feeding roller 21. This conveyor 2 includes a take-in unit 23 for taking in the web W fed from the feeding roller 21 between the feeding roller 21 and the take-up roller 22. The take-in unit 23 includes two drive rollers 231, two nip rollers 232 and an edge position adjuster 234 provided between the two drive rollers 231. Each drive roller 231 drives the web W wound thereon by being rotated by a drive force of a motor. The two nip rollers 232 are respectively provided to correspond to the two drive rollers 231, and the web W is sandwiched between each nip roller 232 and the corresponding drive roller 231. The edge position adjuster 234 adjusts the position of an end of the web Win the X direction, which is a width direction of the web W.

Further, the conveyor 2 includes a plurality of support rollers 24 for supporting the web W between the take-in unit 23 and the take-up roller 22. These support rollers 24 convey the web W in the Y direction while supporting the web W, to which the inks are discharged by the ink-jet method, from below. Particularly, the plurality of support rollers 24 are obliquely arrayed so that the support roller 24 more on a downstream side in a conveying direction (Y direction) of the web W is located at a higher position. Therefore, the web W conveyed by these support rollers 24 is obliquely conveyed to ascend in the Y direction.

Further, the conveyor 2 includes a plurality of support rollers 25 for supporting the web W between the support rollers 24 and the take-up roller 22 and a dryer 26 arranged between these support rollers 25 and the take-up roller 22. The dryer 26 includes a heat drum 261 and support rollers 262 for supporting the web W moving from the heat drum 261 toward the take-up roller 22. The heat drum 261 is rotationally driven according to the conveyance of the web W and dries the web W by heating the web W by a built-in heater. Further, the conveyor 2 includes a plurality of support rollers 27 for supporting the web W moving from the dryer 26 toward the take-up roller 22. Furthermore, the conveyor 2 includes a drive roller 281 and a nip roller 282 arranged between these support rollers 27 and the take-up roller 22. The drive roller 281 drives the web W wound thereon by being rotated by a drive force of a motor. The web W is sandwiched between the nip roller 282 and the drive roller 281.

As just described, in the conveyor 2, a conveyance path of the web W is formed by a combination of a plurality of rollers and the web W is conveyed along this conveyance path. Most of the conveyance path is formed in an internal space SP of the housing 100. But a part thereof, e.g., at least one of the feed roller 21 and the take-up roller 22, may be provided outside the housing 100. By doing so, operability in mounting and removing the rolled web W on the feed roller 21 and the take-up roller 22 can be enhanced.

The printing apparatus 1 includes a plurality of head units 3 facing the web W from above supported by the plurality of support rollers 24 in the housing 100. Although described in detail later, each head unit 3 includes a printing head 30. The printing head 30 discharges an ink downward from discharge ports (nozzles) provided in a lower part and attaching the ink to the web W being conveyed below. For example, color printing is realized by the printing heads 30 provided in the respective head units 3 discharging inks having mutually different colors. In this example, six head units 3 are arranged along the conveyance path, but the number of the arranged head units 3 is arbitrary without being limited to this. Further, a combination of the types of the inks to be discharged from the respective printing heads 30 is also arbitrary. Furthermore, a plurality of printing heads may be provided for one head unit.

Further, each head unit 3 is provided with a maintenance part 50 to cover a lower part of the printing head 30 as described next. The function of the maintenance part 50 is to keep the nozzles of the printing head 30 clean and prevent clogging and, maintain a state where the printing head 30 can be quickly used for a printing operation, when necessary. Note that each head unit 3 is arranged at a different angle as shown in FIG. 1, but the configuration thereof itself can be basically the same. Accordingly, in the following description of the head units 3, those head units are not particularly distinguished.

The printing head 30, the maintenance part 50 and a mechanism for supporting those provided in the head unit 3 are described in detail later. Here, how these operate in a series of operations is first summarized.

FIGS. 2A to 2D are diagrams showing a positional relationship of the printing head, the maintenance part and the web. Below the printing head 30, the web W is conveyed with the surface (surface to be printed) thereof facing substantially upward while being supported by the support rollers 24. A rotation axis direction of each support roller 24 is a horizontal direction, more specifically a direction parallel to the X direction. Accordingly, the web W is conveyed in a direction orthogonal to the X direction. As understood from FIG. 1, the conveying direction mainly has a Y-direction component immediately below each printing head 30 but is not necessarily a horizontal direction. In each of the following figures, the conveying direction of the web W immediately below each printing head 30 is represented by an arrow D1.

Figure 2A:
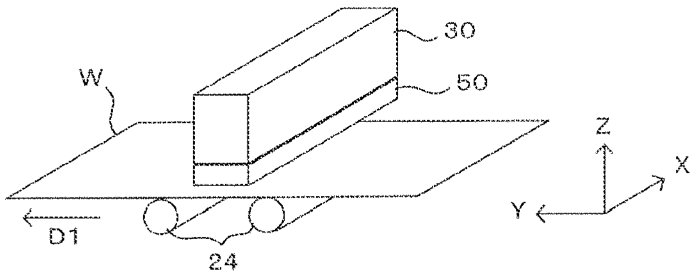
FIGS. 2A to 2D are diagrams showing a positional relationship of the printing head, the maintenance part and the web.

FIG. 2A shows a standby state where the printing operation is not performed. At this time, the printing head 30 is retracted upward from the web W being supported and conveyed by the support rollers 24, and the maintenance part 50 is arranged below the printing head 30, i.e., between the lower surface of the printing head 30 and the upper surface of the web W being conveyed.

Figure 2B:
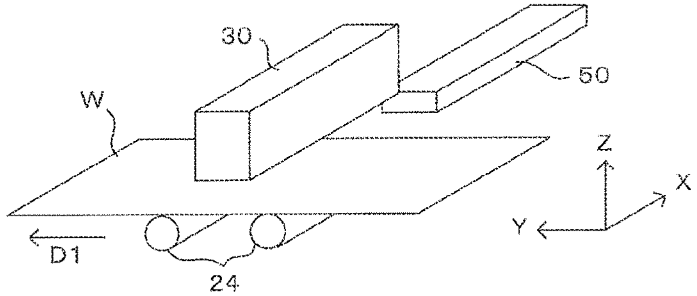

From this state, the maintenance part 50 can be moved and retracted in the (+X) direction as shown in FIG. 2B. In this way, a space below the printing head 30 is opened and the lower surface faces the web W. Further, as described later, when the maintenance part 50 is moved in the (+X) direction along the lower surface of the printing head 30, a maintenance operation is performed for the nozzles provided in the lower part of the printing head 30.

Figure 2C:
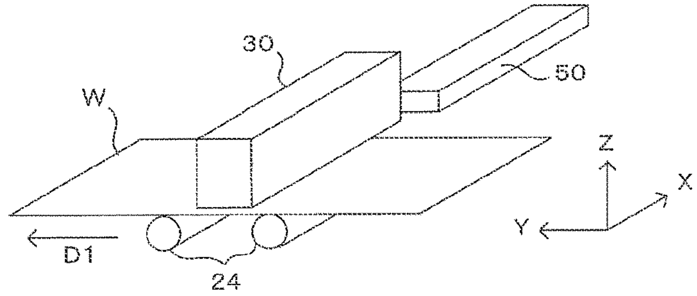

The printing head 30 is movable up and down and, in a lowermost state, the lower surface of the printing head 30 is closely facing the upper surface of the web W as shown in FIG. 2C. In this state, the ink is discharged from the nozzles and printing is performed on the web W. In the later description, the position of the printing head 30 at this time may be referred to as a "printing position". If the printing is finished, the printing head 30 is moved up again and the maintenance part 50 is moved to a position below the printing head 30, thereby returning to the standby state shown in FIG. 2A.

Figure 2D:
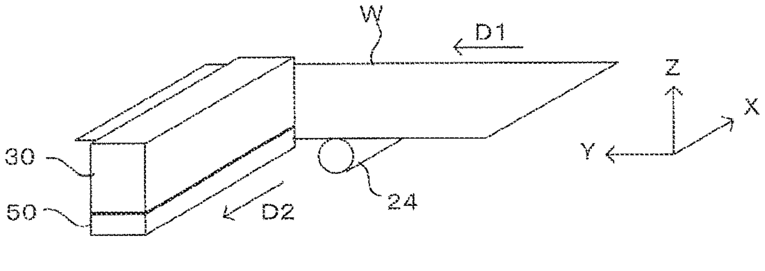

Further, as shown in FIG. 2D, the printing head 30 is movable in a direction of an arrow D2, i.e. in the (−X) direction, from the standby state shown in FIG. 2A. More specifically, the printing head 30 is movable from a position above the web W on the conveyance path as shown in FIG. 2A to a position separated from the web W toward a (−X) direction side, i.e., a position where the web W is not present below the printing head 30, as shown in FIG. 2D.

Figure 3A:
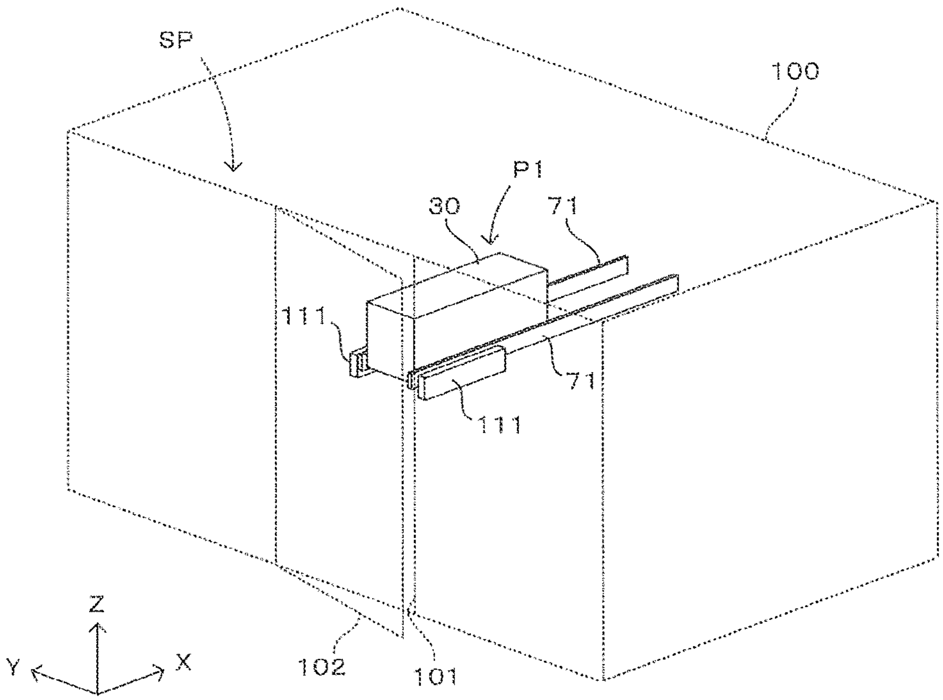
FIGS. 3A and 3B are views showing the positions of the printing head in the housing.
Figure 3B:
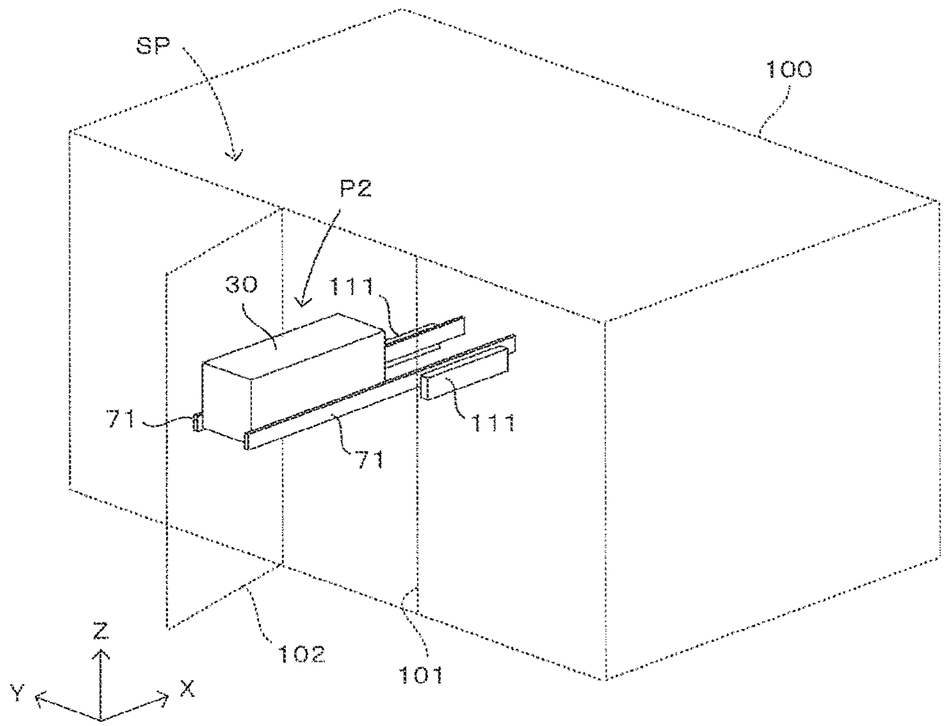

FIGS. 3A and 3B are views showing the positions of the printing head in the housing. As shown in FIG. 3A, the printing head 30 is arranged above the web W on the conveyance path in the housing 100 in which main components of the apparatus are accommodated in the internal space SP. The position of the printing head 30 at this time is referred to as a "first position P1".

A side surface on the (−X) side of the housing 100 serves as a front panel surface used by the operator to perform various operations and maintenance operations. Further, as shown in FIG. 3B, a part of a front panel is an opening 101 in which an openable and closable door 102 is provided. The operator can access the printing head 30 via the opening 101 by opening the door 102.

More specifically, as shown in FIG. 3A, the printing head 30 is mounted on a pair of frame members 71 extending in the X direction in the housing 100. The frame members 71 are supported movably in the X direction by frame supporting side plates 111 fixed in the housing 100. As shown in FIG. 3B, the frame members 71 are moved in the (−X) direction along the frame supporting side plates 111 by the operator opening the door 102 and pulling out the printing head 30 in the (−X) direction. In this way, the printing head 30 is pulled out to an outside space via the opening 101. As a result, the operator can perform a necessary operation by accessing the printing head 30 from a vertical or lateral direction. The position of the printing head 30 at this time is referred to as a "second position P2".

Figure 4:
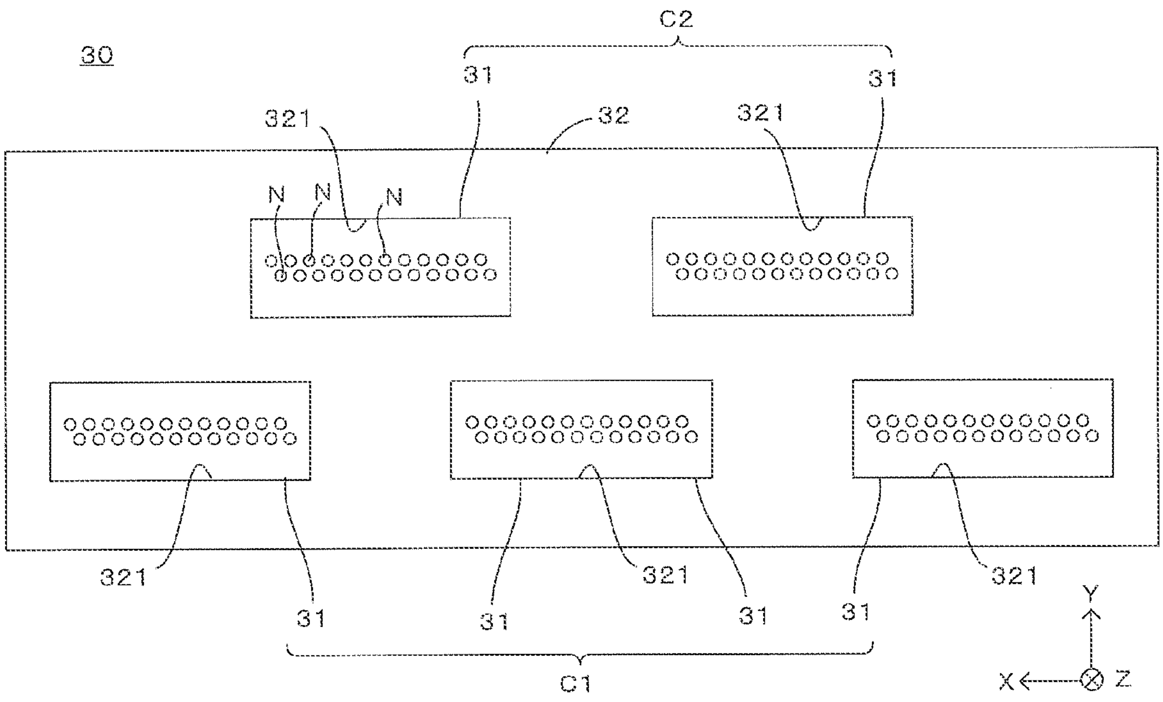
FIG. 4 is a bottom view schematically showing the configuration of the printing head.

FIG. 4 is a bottom view schematically showing the configuration of the printing head 30. The printing head 30 includes a plurality of (five) nozzle blocks 31. The plurality of nozzle blocks 31 are arrayed in two rows in a so-called staggered manner in the X direction. In other words, a nozzle block row C1 composed of three nozzle blocks 31 arrayed in parallel to the X direction and a nozzle block row C2 composed of two nozzle blocks 31 arrayed in parallel to the X direction are provided in the Y direction. In each nozzle block 31, a plurality of nozzles N are arranged in a staggered manner in the X direction to face the web W from above, and each nozzle N discharges the ink to the web W by the ink-jet method. The printing head 3 includes a holding member 32 for holding the respective nozzle blocks 31. The holding member 32 includes a plurality of insertion holes 321 provided to correspond to the plurality of nozzle blocks 31, and the plurality of nozzle blocks 31 are fixed to the holding member 32 while being inserted in the corresponding insertion holes 321. Such a holding member 32 can be constituted by a non-elastic member made of metal or resin.

As shown in FIG. 1, the posture of each of the plurality of head units 3 is set according to the inclination of the web W supported by the plurality of support rollers 24. That is, the respective head units 3 are so arranged that the head unit 3 more on an upstream side in the conveying direction of the web W, out of the plurality of head units 3, is more largely inclined with respect to the Z direction. However, the head unit 3 most downstream in the conveying direction (Y direction) of the web W is horizontally arranged and not inclined with respect to the Z direction. The head units 3 other than this most downstream head unit 3 are inclined to be higher in the conveying direction of the web W.

Figure 5:
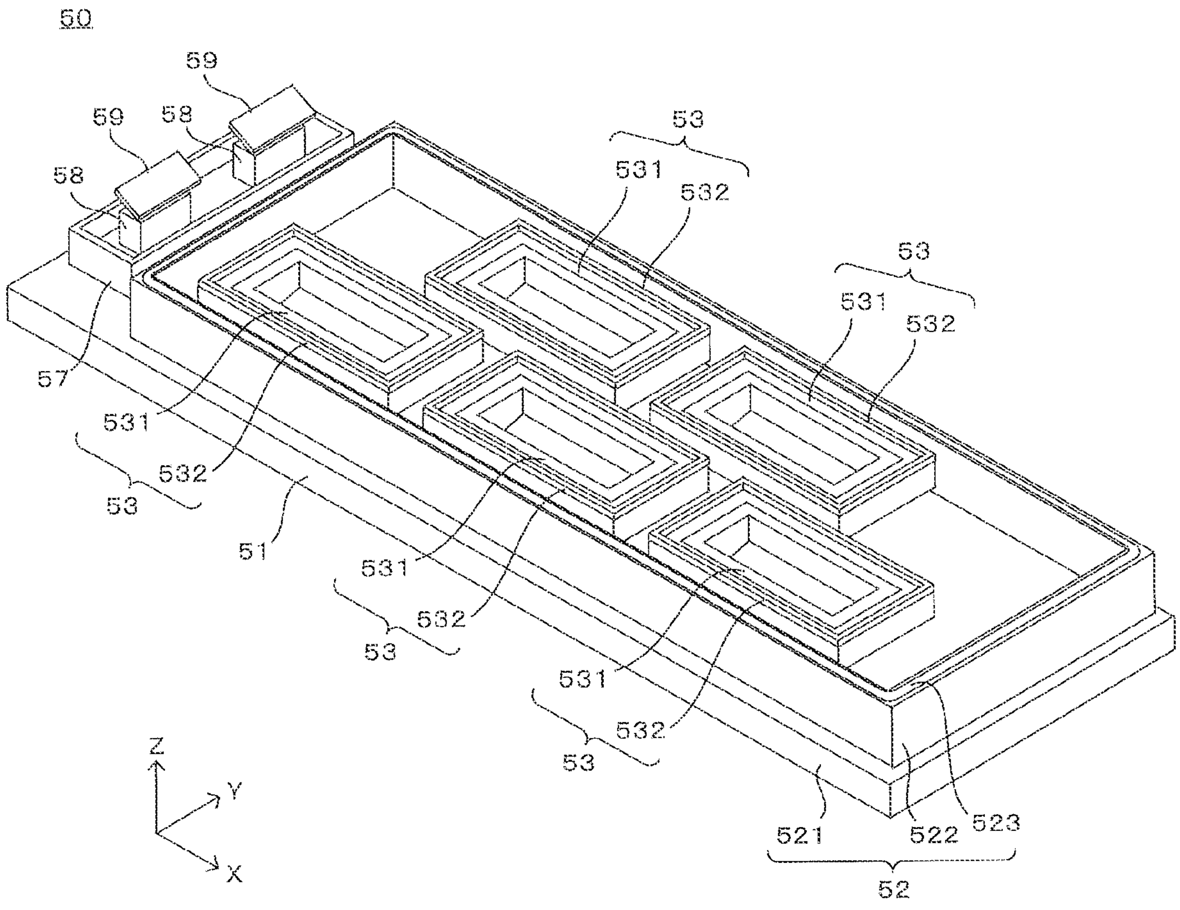
FIG. 5 is a perspective view schematically showing the configuration of the maintenance part.
Figure 6A:
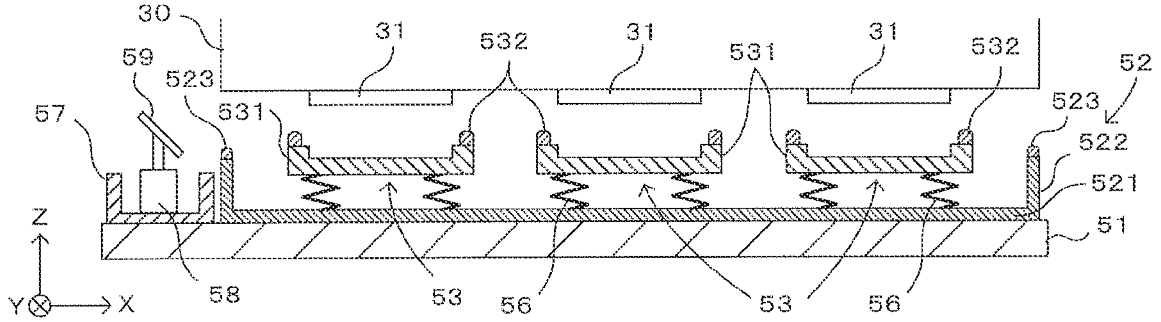
FIGS. 6A to 6C are schematic views for illustrating function of the maintenance part.
Figure 6B:
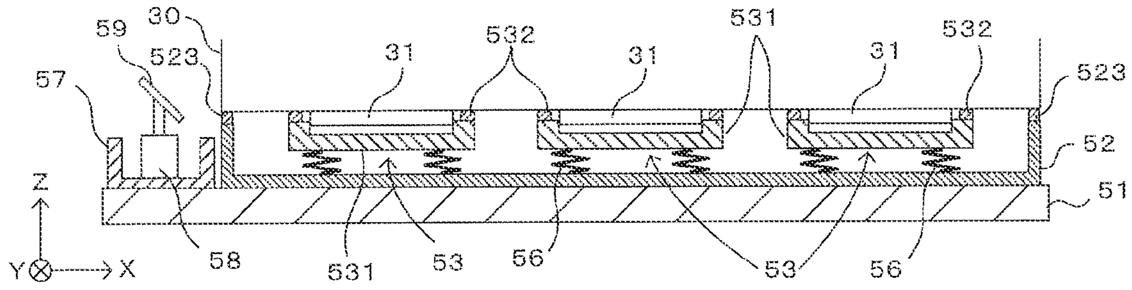
Figure 6C:
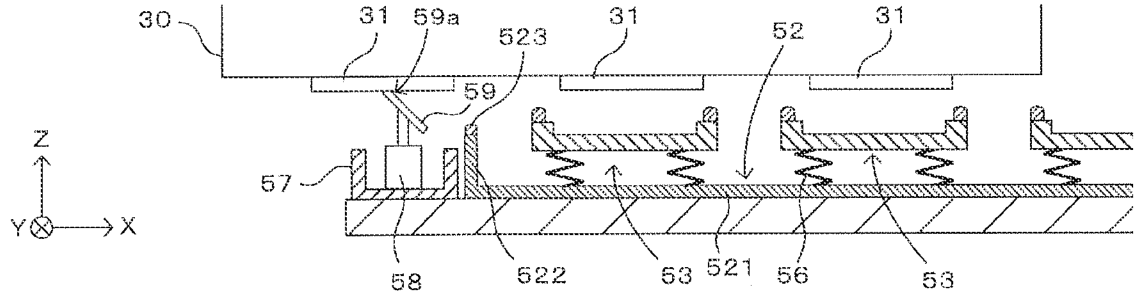

FIG. 5 is a perspective view schematically showing the configuration of the maintenance part. FIGS. 6A to 6C are schematic views for illustrating function of the maintenance part. As described above, the maintenance part 50 is provided for each of the plurality of printing heads 30. Each maintenance part 50 faces the corresponding printing head 30 from below. A plurality of the maintenance parts 50 provided to correspond to the plurality of printing heads 30 have a common configuration. Thus, one maintenance part 50 is described.

The maintenance part 50 includes a base member 51 having a rectangular parallelepiped shape long in the X direction. Box-shaped vats 52, 57 having an open upper part are mounted on this base member 51 to receive the ink discharged from the printing head 30 and various processing liquids. Caps 53 are provided to correspond to the number and positions of nozzle blocks 31 in the printing head 30 inside the larger vat 52. The vat 52 includes a bottom plate 521 having a rectangular shape in a plan view and a side wall 522 rising upward from a peripheral edge part of the bottom plate 521. The side wall 522 is a frame body having a rectangular shape in a plan view. An elastic member 523 is mounted on the entire periphery of the upper end of the side wall 522. The cap 53 is structured such that a sealing member 532 is mounted to surround an opening on the upper end of a cap body 531 formed into a box shape corresponding to the outer shape of the nozzle block 31 and open in an upper part. The sealing member 532 is, for example, a rubber component formed into a substantially rectangular ring shape.

In FIGS. 6A to 6C, a cross-section of the maintenance part 50 is shown. As shown in FIG. 6A, the caps 53 are respectively arranged at positions corresponding to the respective nozzle blocks 31 with the maintenance part 50 positioned immediately below the printing head 30. Each cap 53 is, for example, supported in a state biased upward by an elastic member 56 such as a compression spring. As shown in FIG. 6B, the elastic member 523 of the vat 52 is in contact with a lower surface part of the printing head 30 with the respective caps 53 capping the corresponding nozzle blocks 31.

As shown in FIG. 6B, the nozzle blocks 31 are surrounded by the caps 53 by lowering the printing head 30. Spaces around the nozzle blocks 31 are closed by biasing forces of the sealing members 532 and the elastic members 56. In this way, the drying of the ink around each nozzle N (FIG. 4) is suppressed. Further, in this state, purging can be performed by discharging the ink from each nozzle N if necessary.

The ink discharged into the caps 53 is discharged via an unillustrated discharge system. For such a system and the purging performed thereby, those described in JP 2022-052195A previously disclosed by the applicant of this application can be suitably applied. Accordingly, this system and the purging are not described.

Referring back to FIG. 5, wiper blades 59 supported movably up and down by elevating mechanisms 58 using appropriate actuators are provided inside the smaller vat 57. Two pairs of the elevating mechanism 58 and the wiper blade 59 are provided to respectively correspond to two nozzle block rows C1, C2.

As shown in FIG. 6C, the maintenance part 50 by moves in the (+X) direction with the caps 53 separated from the printing head 30 and upper ends 59*a* of the wiper blades 59 positioned slightly higher than the lower surfaces of the nozzle blocks 31. At this time, the upper ends 59*a* of the wiper blades 59 are rubbed against the lower surfaces of the nozzle blocks 31. In this way, the ink adhering around the nozzles N is wiped off and the nozzles N are cleaned. The maintenance part 50 is moved further toward the (+X) direction side than an end surface of the printing head 30, whereby the nozzles N can be cleaned for all the nozzle blocks 31.

Figure 7A:
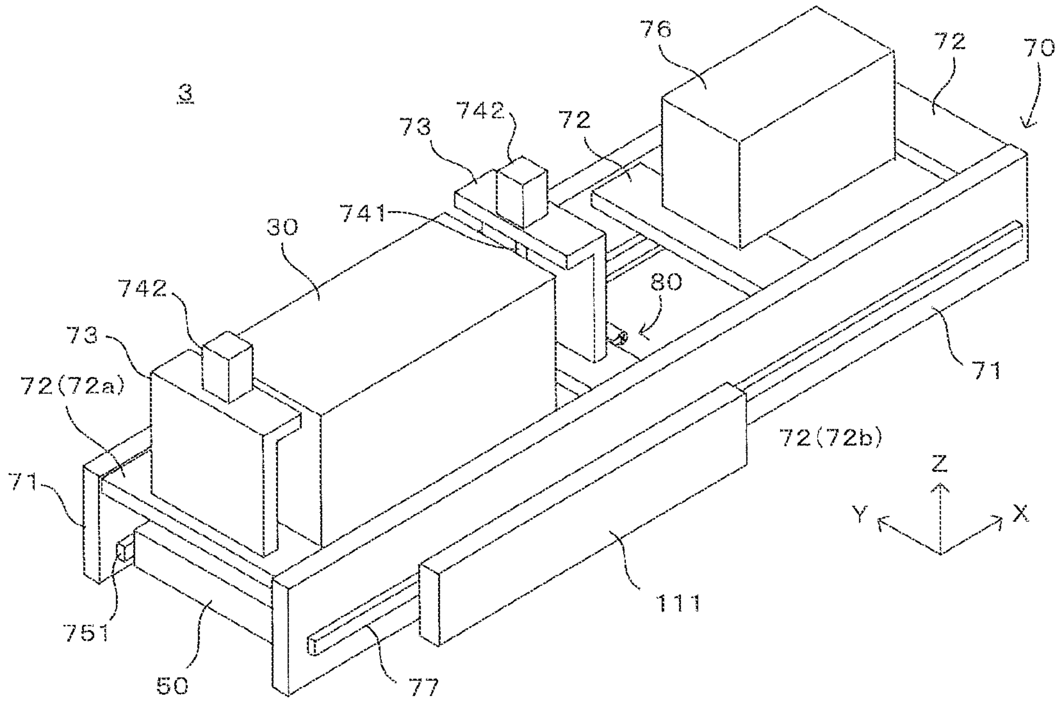
FIGS. 7A and 7B are perspective views showing the structure of the head unit.
Figure 7B:
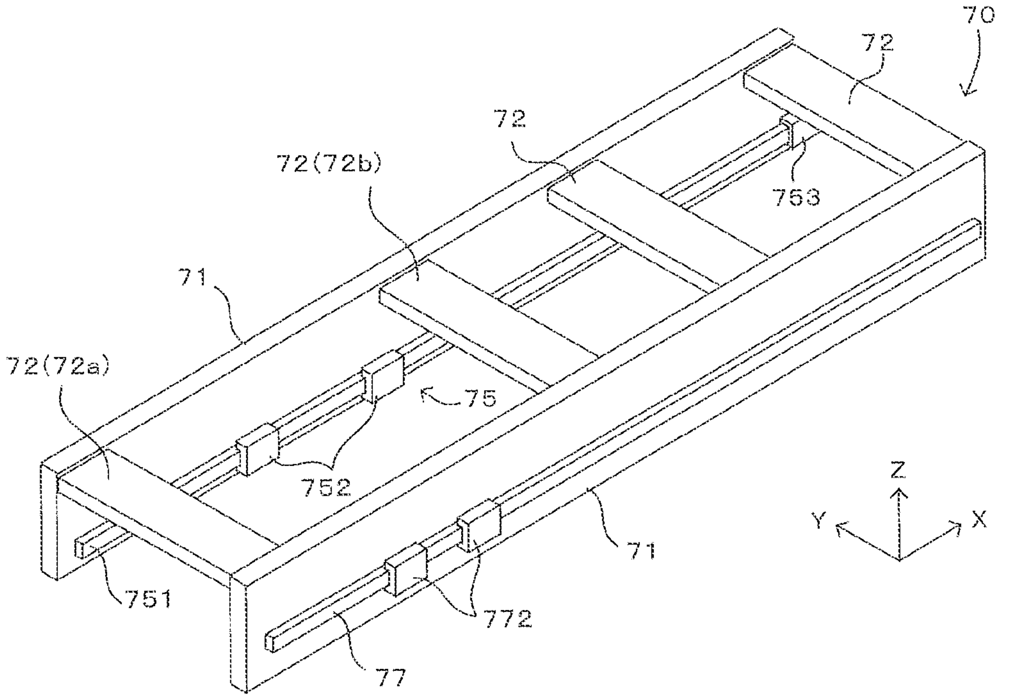

Next, the structure of the head unit 3 is described in more detail with reference to FIGS. 7A to 8C. FIGS. 7A and 7B are perspective views showing the structure of the head unit. More particularly, FIG. 7A is a perspective view showing the appearance of the head unit 3, and FIG. 7B is an appearance perspective view showing a frame 70 of the head unit 3. The head unit 3 is structured by mounting respective components on the frame 70 shown in FIG. 7B. To clearly show a frame structure shielded by these components, a structure when several components are mounted on the frame 70 before main parts are assembled is shown in FIG. 7B. Further, FIGS. 8A to 8C are side views showing the structure and operation of the head unit.

As shown in FIG. 7B, the frame 70 is structured such that the pair of frame members 71 extending in parallel with the X direction as a longitudinal direction are coupled by several horizontal members 72 extending in the Y direction. The shapes of the frame members 71, the shapes, arrangement and number of the horizontal members 72 and the like are arbitrary without being limited to the shown ones. However, since the maintenance part 50 reciprocates between the frame members 71 arranged to face each other as described later, the frame 70 is desirably structured not to hinder this movement.

On the (−X) direction sides of the frame members 71, two horizontal members 72 (72*a*, 72*b*) are arranged at a predetermined interval in the X direction. This interval is larger than a length of the printing head 30 in the X direction. Head supporting side plates 73, 73 (FIG. 7A) for supporting the printing head 30 movably up and down are mounted on the upper surfaces of these horizontal members 72*a*, 72*b*.

Figure 8A:
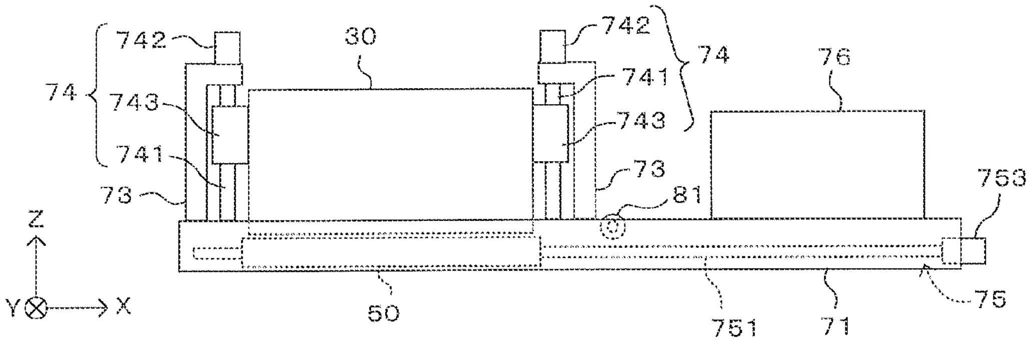
FIGS. 8A to 8C are side views showing the structure and operation of the head unit.
Figure 8B:
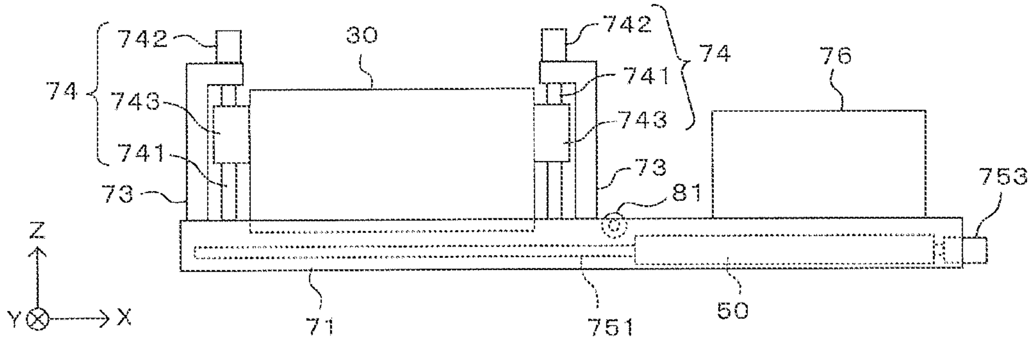
Figure 8C:
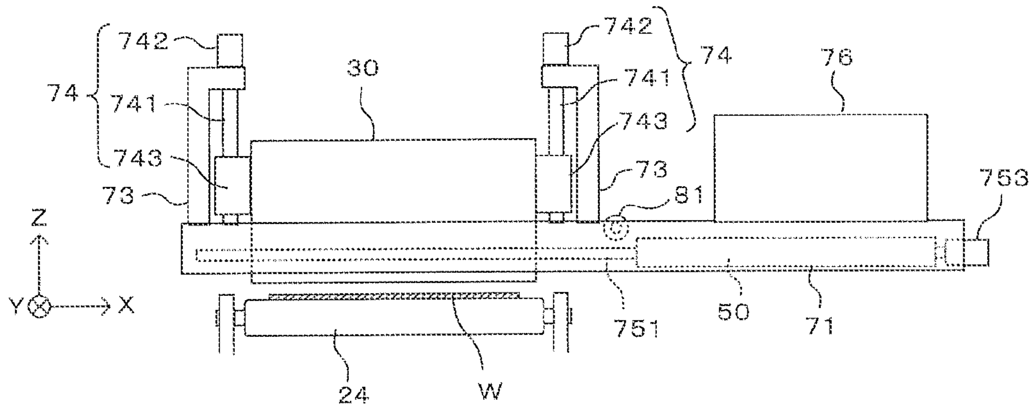

Specifically, as shown in FIG. 8A, elevating mechanisms 74, 74 are respectively provided on the head supporting side plates 73, 73. The elevating mechanism 74 is, for example, a ball screw mechanism and includes a ball screw 741 extending in the vertical direction, a motor 742 for rotationally driving the ball screw 741 and an elevating block 743 having a nut engaged with the ball screw 741. The elevating blocks 743 are mounted on both end parts in the X direction of the printing head 30. Therefore, the motors 742, 742 synchronously rotate in response to a control command from the controller 10, whereby the elevating blocks 743, 743 move up and down to move the printing head 30 up and down with respect to the frame members 71.

As shown in FIG. 7B, guide rails 751 extending in the X direction are mounted on inner surfaces of the pair of frame members 71 facing each other. Sliders 752 are engaged with these guide rails 751 movably in the X direction, and motors 753 serving as drive sources for driving the sliders 752 in the X direction along the guide rails 751 are coupled to the guide rails 751. The maintenance part 50 is mounted on these sliders 752.

Accordingly, the motors 753 operate in response to a control command from the controller 10, whereby the maintenance part 50 moves in the X direction along the guide rails 751 between the pair of frame members 71 as shown in FIGS. 8A and 8B. That is, the guide rails 751, the sliders 752 and the motors 753 function as a linear movement mechanism 75 for moving the maintenance part 50 in the X direction. An appropriate one, for example, such as a linear motor, a ball screw mechanism, an air cylinder or a belt drive mechanism can be selected and used as such a linear movement mechanism 75.

The head unit 3 having such a structure can assume a state shown in FIG. 8A where the printing head 30 is retracted upward and the maintenance part 50 is located below the printing head 30, a state shown in FIG. 8B reached by retracting the maintenance part 50 in the (+X) direction from the former state, and a state shown in FIG. 8C reached by retracting the maintenance part 50 in the (+X) direction and lowering the printing head 30 to a position below the frame members 71. As is clear from comparison with FIGS. 2A to 2C, the state shown in FIG. 8A, the state shown in FIG. 8B and the state shown in FIG. 8C respectively correspond to FIGS. 2A, 2B and 2C.

Referring back to FIG. 7A, the head unit 3 is further described. An electrical box 76 is mounted on the (+X) direction sides of the frame members 71. The electrical box 76 accommodates various devices for properly operating the head unit 3 such as a control circuit for controlling the printing head 30 and the linear movement mechanism 75, a pump for feeding the ink to the printing head 30 and a power supply circuit for supplying power to these. By mounting the electrical box 76 provided with these on the frame members 71 integrally with the printing head 30, a stable operation can be realized by suppressing lengths of pipes and cables to the printing head 30.

Further, guide rails 77 are mounted on the respective outer surfaces of the pair of frame members 71, i.e. on surfaces opposite to those where the linear movement mechanism 75 is provided. Sliders 772 are engaged with the guide rails 77 movably in the X direction. The sliders 772 are mounted on the frame supporting side plates 111 fixed to the housing 100. Therefore, the frame members 71 are movable in the X direction with respect to the housing 100. As a result, the entire head unit 3 integrated with the frame members 71 is movable in the X direction with respect to the housing 100.

Movable ranges of the frame members 71 are specified by the guide rails 77. In a state moved farthest to the (+X) side, the entire head unit 3 is accommodated in the internal space SP of the housing 100 and the printing head 30 is positioned above the web W as shown in FIG. 3A. The position of the printing head 30 at this time is referred to as an "inside position" in the invention. On the other hand, in a state moved farthest to the (−X) side, at least a part of the printing head 30, preferably the entire printing head 30, is exposed to outside from the internal space SP as shown in FIG. 3B. The position of the printing head 30 at this time is referred to as an "outside position" in the invention.

Such a movement of the head unit 3 is made, for example, when a user (operator) performs a maintenance operation for the head unit 3, particularly the printing head 30. Therefore, this movement may be realized by the operator's manual work (using a tool if necessary). Drive sources for automatically moving the frame members 71 need not necessarily be provided in the apparatus.

A cleaner part 80 is provided on the (+X) direction side of the printing head 30 in the head unit 3. As described later, the cleaner part 80 is provided for the purpose of wiping the caps 53 and the wiper blades 59 provided in the maintenance part 50 to remove the ink remaining on and adhering to these.

Figure 9:
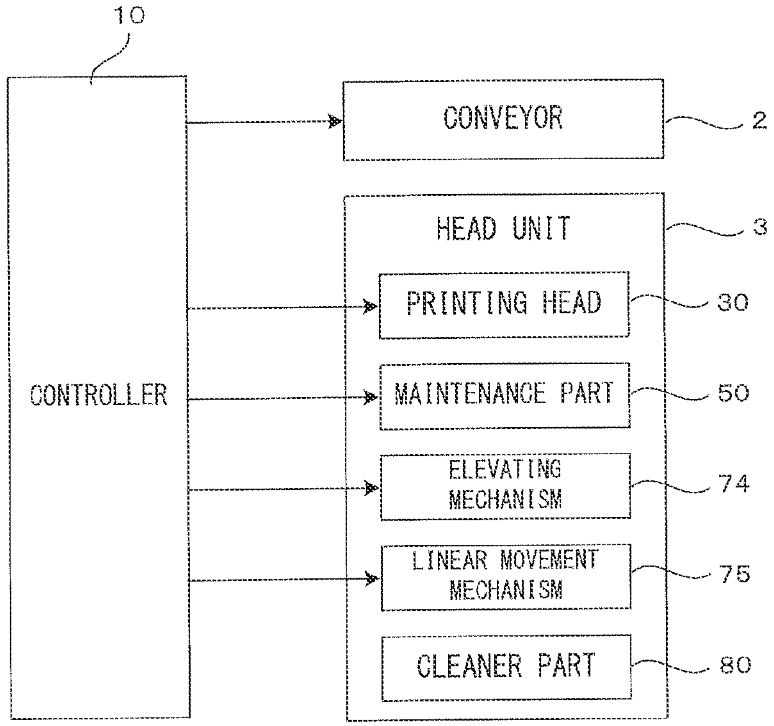
FIG. 9 is a block diagram showing an electrical configuration of this printing apparatus.

FIG. 9 is a block diagram showing an electrical configuration of this printing apparatus. The controller 10 gives a control command to each component of the apparatus described above to cause each component to perform a predetermined operation. For this purpose, the controller 10 is provided with a CPU, which is an execution subject of various control programs, a storage device for storing and saving the control programs and various pieces of data, a user interface device and the like. For example, a computer device, a workstation or the like having a general hardware configuration can be used as the controller 10.

Figure 10A:
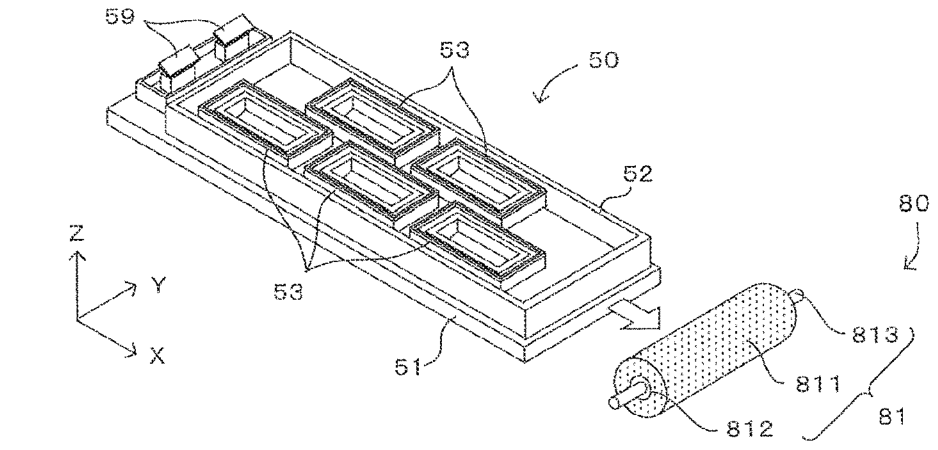
FIGS. 10A to 10C are views showing the configuration of the cleaner part.
Figure 10B:
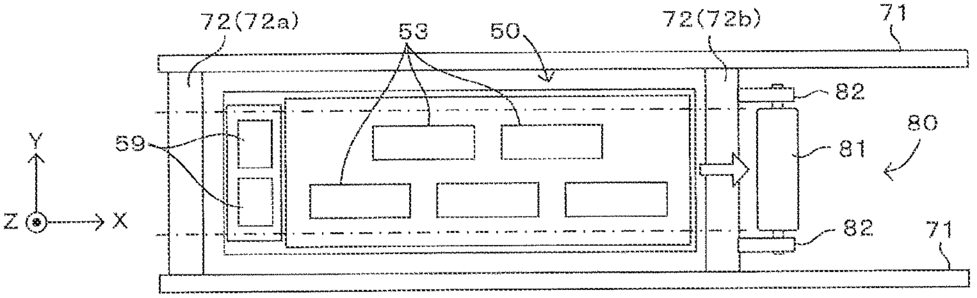
Figure 10C:
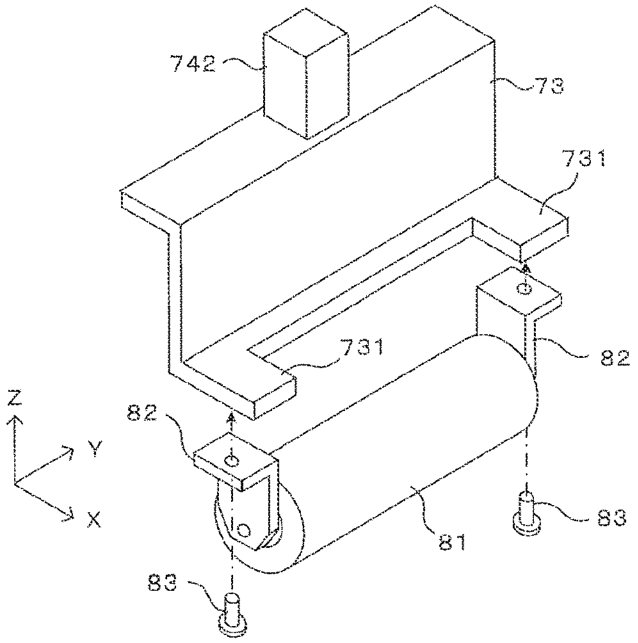

FIGS. 10A to 10C are views showing the configuration of the cleaner part 80. As shown in FIGS. 10A and 10B, the cleaner part 80 includes a cleaning roller 81 arranged on a movement path when the maintenance part 50 moves in the (+X) direction. As shown by dashed-dotted lines in FIG. 10B, a length of the cleaning roller 81 in the Y direction is set to include an entire distribution range in the Y direction of the caps 53 and the wiper blades 59, which are objects to be cleaned. Further, in a height direction, the cleaning roller 81 is arranged to overlap paths of the upper ends of the respective caps 53 and wiper blades 59 when the maintenance part 50 moves in the (+X) direction.

A surface layer 811 of the cleaning roller 81 is made of a porous spongy and elastic material. Specifically, the cleaning roller 81 can be such that the cylindrical surface 811 described above is provided on a surface of a hollow or solid cylindrical core 812 made of metal. A rotary shaft 813 is provided coaxially with a center of the core 812, and the rotary shaft 813 is rotatably supported by appropriate bearing members 82, 82. The bearing member 82*s* are fixed to any one of the frame member 71 and members integrally coupled to the frame member 71. For example, as shown in FIG. 10C, projecting parts 731 for mounting the bearing members 82 can be provided on a (+X) side surface of the one arranged on the (+X) side, out of the pair of head supporting side plates 73, and the bearing members 82 can be, for example, fixed and fastened to the projecting parts 731 by fastening members 83 such as screws. Note that if the fastening members 83 are attachable to and detachable from the projecting parts 731, the cleaning roller 81 is easily replaced on the head supporting side plate 73.

According to such a structure, the cleaner part 80 is integrated, that is, moves together with the printing head 30 in movements in the X direction except ascending and descending movements of the printing head 30 by the elevating mechanisms 74. Therefore, a positional relationship of the printing head 30 and the cleaner part 80 in the X direction is invariable. This is similar also in both relative movements of the printing head 30 and the maintenance part 50 and a movement in pulling out the printing head 30 to the outside of the housing 100.

Besides this, the bearing members 82 may be mounted on coupling parts provided on the frame members 71 or the horizontal member 72 directly or via appropriate coupling members coupled to these. To enable that, the shapes of the bearing members 82 and the coupling parts (coupling members) can be appropriately set.

In this case, a space below the cleaner part 80 is desirably open in a state mounted in the head unit 3. Particularly the cleaner part 80 is desirably accessible from below the frame members 71 by the operator. The cleaning roller 81 of the cleaner part 80 is provided for the purpose of wiping the wiper blades 59 and the caps 53 of the maintenance part 50 to remove the adhering ink. Thus, the cleaning roller 81 is stained as being used and worn and deteriorated due to abrasion. Therefore, regular maintenance operations and component replacements are indispensable to maintain satisfactory cleanability. By setting a state where the cleaner part 80 is accessible from below the frame members 71 as described above, the operability of this operation can be improved.

In the head unit 3 of this embodiment, the cleaning roller 81 is arranged in a space between the pair of frame members 71 parallel to each other, and no other component is present below the cleaning roller 81. Thus, the cleaning roller 81 is easily accessed from below. Further, as shown in FIG. 10C, the cleaner part 80 can be easily attached to and detached from the head unit 3 by an accessing operation from below by mounting fixing members 83 for fixing the cleaner part 80 to the head unit 3 from a lower surface side. At this time, a preliminary operation of removing the other components in advance and the like is not necessary.

FIGS. 11A to 11D are views showing the action of the cleaner part 80. Note that, in an actual operation, the X-direction position of the cleaning roller 81 remains unchanged and the maintenance part 50 moves in the (+X) direction. However, in FIGS. 11A to 11D, the X-direction position of the maintenance part 50 is fixed and the cleaning roller 81 is shown to move in the (−X) direction for the sake of graphical representation.

Figure 11A:
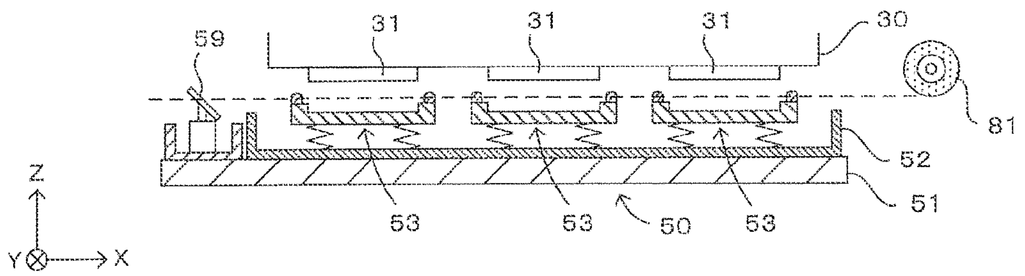
FIGS. 11A to 11D are views showing the action of the cleaner part.

As shown in FIG. 11A, the cleaning roller 81 is located further on the (+X) direction side than the maintenance part 50 with the maintenance part 50 positioned immediately below the printing head 30. Further, in the height direction (Z direction), the cleaning roller 81 is arranged at such a position that the upper ends of the caps 53 (more specifically, the upper ends of the sealing members 532) and the upper ends of the wiper blades 59 come in contact with the surface layer 811. If necessary, heights of the wiper blades 59 can be adjusted by operating the elevating mechanisms 58.

Figure 11B:
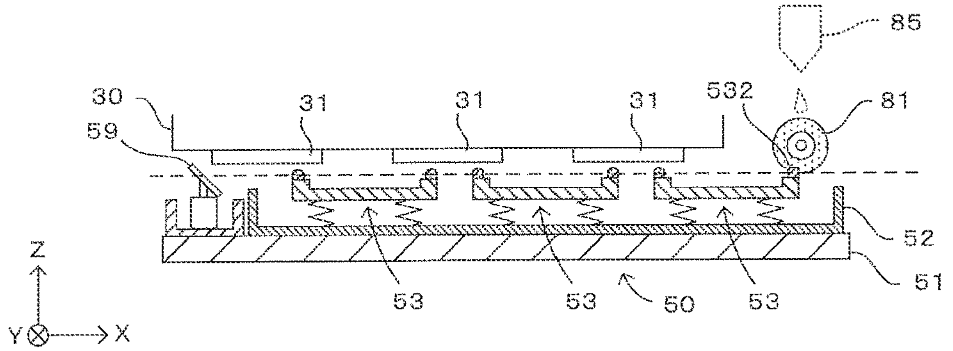

From this state, the maintenance part 50 starts to move in the (+X) direction as shown in FIG. 11B. In this way, the cleaning roller 81 comes into contact with the upper ends of the sealing members 532 and cleans these. At this time, an appropriate cleaning liquid supplied from an unillustrated supply source may be supplied from a nozzle 85 arranged above the cleaning roller 81 and the sealing members 532 may be wet-cleaned. The cleaning liquid and ink components dropping from the cleaning roller 81 can be collected by the vat 52 provided in the maintenance part 50.

Figure 11C:
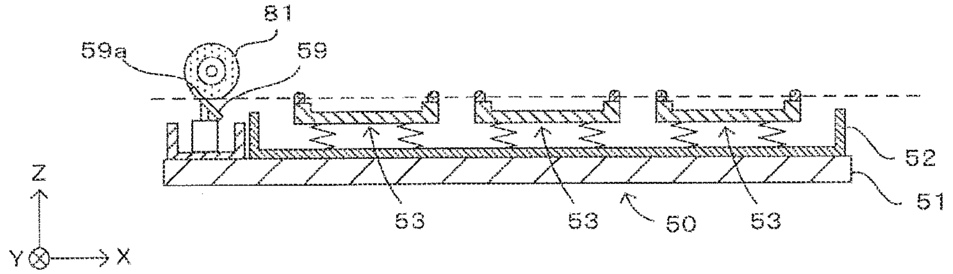
Figure 11D:
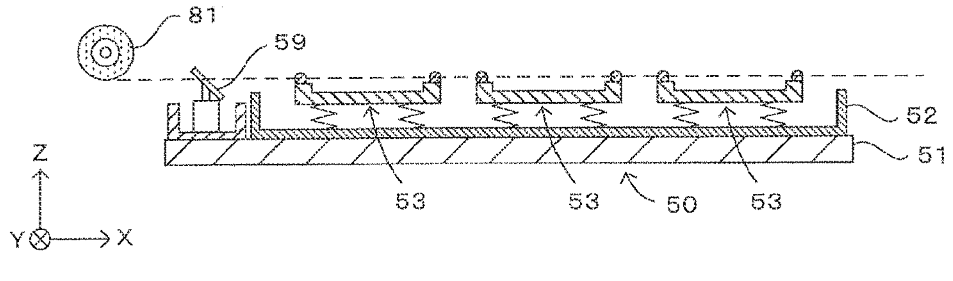

The plurality of caps 53 are successively cleaned by the maintenance part 50 continuously moving in the (+X) direction. Then, as shown in FIG. 11C, the cleaning roller 81 comes into contact with at least the upper ends of the wiper blades 59 to clean these. Finally, as shown in FIG. 11D, the maintenance part 50 moves further to the (+X) side than the cleaning roller 81 and the cleaning operation is finished.

In this way, at least upper end parts of the caps 53 and the wiper blades 59 can be cleaned. Note that although the cleaning roller 81 cleans both the caps 53 and the wiper blades 59 here, only either the caps 53 or the wiper blades 59 may be cleaned. Further, a member for cleaning the caps 53 and a member for cleaning the wiper blades 59 may be respectively provided.

In the above operation, the maintenance part 50 passes below the cleaning roller 81. Here, both in an initial state shown in FIG. 11A and a final state shown in FIG. 11D, the maintenance part 50 is at a position deviated in the X direction from a position right below the cleaning roller 81. Thus, the state where no other component is present below the cleaning roller 81 is maintained in the head unit 3 except during a movement of the maintenance part 50.

Figure 12A:
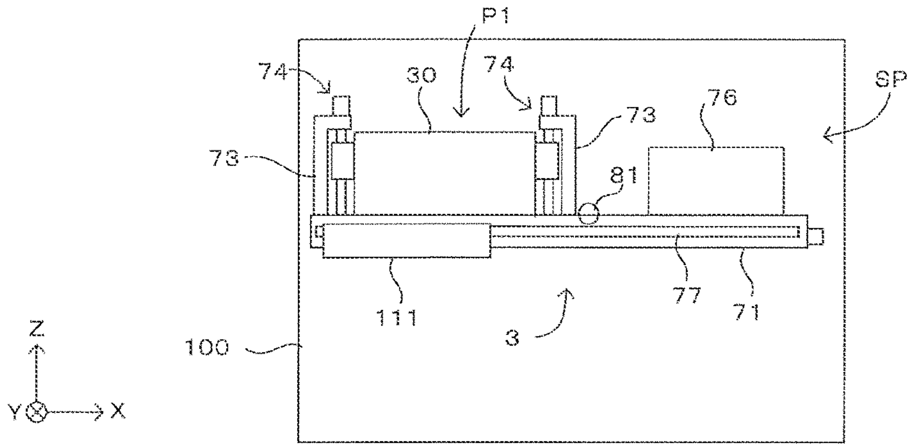
FIGS. 12A to 12C are views showing the positions of the cleaning roller in an operation of the operator to pull out the head unit.
Figure 12B:
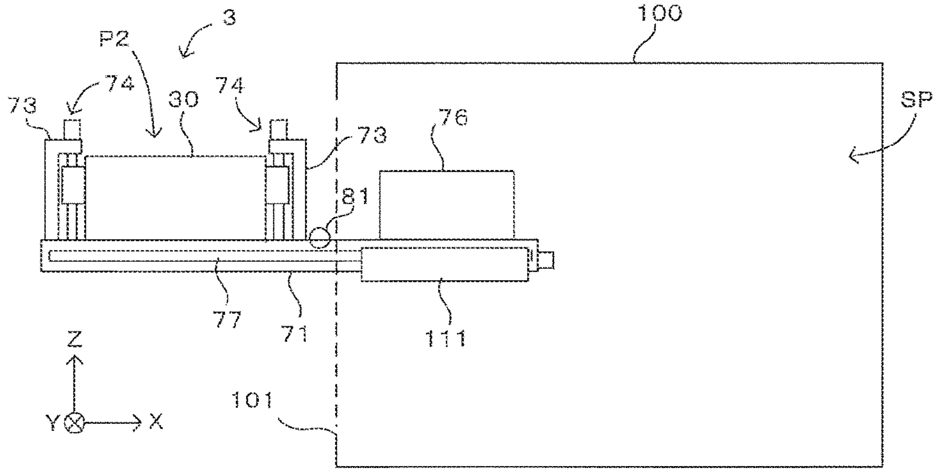
Figure 12C:
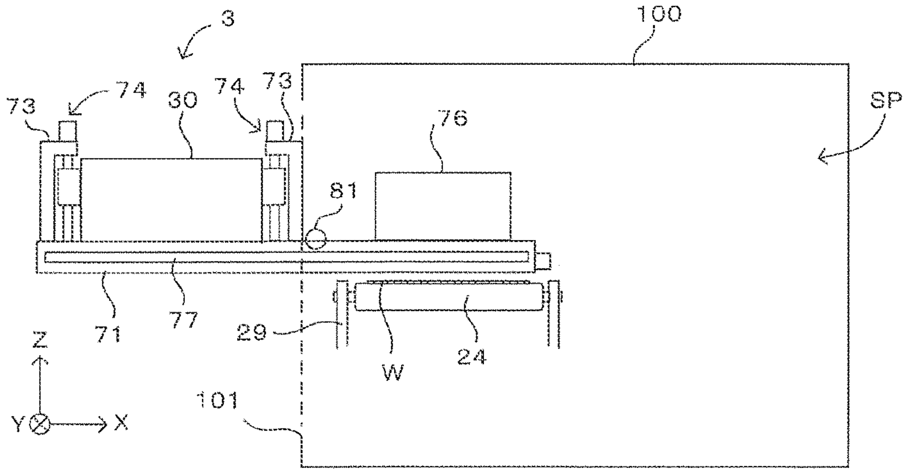

FIGS. 12A to 12C are views showing the positions of the cleaning roller 81 in an operation of the operator to pull out the head unit. The cleaner part 80 (cleaning roller 81) is arranged on the (+X) direction side of the printing head 30. Therefore, as shown in FIG. 12A, the cleaning roller 81 is also located in the housing 100 when the head unit 3 is accommodated in the housing 100 and the printing head 30 is at the first position P1.

On the other hand, as shown in FIG. 12B, when the head unit 3 is pulled out in the (−X) direction and the printing head 30 is located at the second position P2, the cleaning roller 81 is located further on the (−X) direction side than the opening surface 101 of the housing 100 shown by a broken line in FIG. 12B and located outside the internal space SP of the housing 100. More precisely speaking, a movable range of the head unit 3 and the disposed position of the cleaning roller 81 in the head unit 3 are set to achieve such a positional relationship.

As described above, the state where the space below the cleaning roller 81 is open without any other component arranged is set in the head unit 3. Accordingly, not only the printing head 30, but also the cleaning roller 81 is easily accessed from below by pulling out the head unit 3 in this way. Thus, operability when the operator performs a maintenance operation such as the cleaning or the exchange of the cleaning roller 81 is very good.

Note that the position of the maintenance part 50 in pulling out the head unit 3 may be a position immediately below the printing head 30 or may be a position retracted in the (+X) direction. As shown in FIGS. 11A and 11D, the space below the cleaning roller 81 is open and accessibility to the cleaning roller 81 is not impaired even if the maintenance part 50 is located at any one of these positions.

If a maintenance operation is for the printing head 30, the maintenance part 50 is desirably retracted toward the (+X) direction side and the space below the printing head 30 is open. On the other hand, in a maintenance operation for the maintenance part 50, the maintenance part 50 is desirably pulled out together with the printing head 30. With the head unit 3 pulled out, the position of the maintenance part 50 can be changed by operating the linear movement mechanism 75.

Here, the cleaning roller 81 advances to the outside of the internal space SP of the housing 100 with the head unit 3 pulled out. However, in terms of improving operability, the cleaning roller 81 needs not necessarily move to the outside of the internal space SP. As shown in FIG. 12C, there is no hindrance to access to the cleaning roller 81 from below if the cleaning roller 81 is moved further to the (−X) side than the conveyance path of the web W, more strictly moved further to the (−X) side than the support rollers 24 constituting the conveyance path below the head unit 3 and a supporting member 29 on the (−X) side of the support rollers 24. That is, even if the cleaning roller 81 remains inside the internal space SP, good accessibility can be obtained.

As described above, in the above embodiment, the printing apparatus 1 functions as a "printing apparatus" of the invention, and the web W corresponds to a "base material" of the invention. The conveyor 2, particularly the rollers 24, 25 and the like, functions as a "conveying mechanism" of the invention. Particularly, out of those, the support rollers 24 correspond to "conveyor rollers" of the invention and the supporting member 29 for those corresponds to a "roller supporting member" of the invention.

Further, the printing head 30 functions as a "printing head" of the invention, and the nozzle N corresponds to a "discharge port" of the invention. Further, the elevating mechanism 74 functions as an "elevating mechanism" of the invention. Further, the maintenance part 50 of the above embodiment functions as a "maintenance part" of the invention, and the cap 53 and the wiper blade 59 respectively correspond to a "cap" and a "wiper" of the invention.

Further, the frame 70 functions as a "head supporting member" of the invention, and the frame supporting side plate 111 functions as a "supporting mechanism" of the invention. Further, the housing 100, the opening 101 and the door 102 respectively function as a "housing", an "opening" and a "door" of the invention. The internal space SP of the housing 10 corresponds to an "internal space" of the invention.

Further, the cleaning roller 81 functions as a "cleaning member" of the invention and the surface layer 811 thereof serves as a "porous member" of the invention.

The conveying direction of the web W represented by the arrow D1 corresponds to a "first direction" of the invention, and the direction of the arrow D2 (i.e. X direction), which is a horizontal direction orthogonal to the conveying direction, corresponds to a "second direction" of the invention. Furthermore, the position P1 of the printing head 30 shown in FIG. 3A corresponds to an "inside position" of the invention, and the position P2 of the printing head 30 shown in FIG. 3B corresponds to an "outside position" of the invention.

Note that the invention is not limited to the above embodiment and various changes other than the aforementioned ones can be made without departing from the gist of the invention. For example, the cleaning member of the above embodiment is the cleaning roller 81 having the surface formed of a porous elastic material. However, the cleaning member may not be rotational and, for example, may be a block-like or blade-like member formed of a porous elastic material. Further, a member having a brush-like or belt-like shape and formed of a material other than porous elastic materials may be used as the cleaning member.

Further, the cleaning member may be provided to clean only either the caps or the wipers. Further, cleaning members may be individually provided for those as described above.

Further, the maintenance part 50 of the above embodiment performs maintenance for the printing head 30 by moving in the direction orthogonal to the conveying direction of the web. Instead of this, the maintenance part 50 may be configured to move in a direction along the conveying direction. Further, a pull-out direction of the printing head 30 is desirably a horizontal direction but needs not necessarily be orthogonal to the conveying direction of the base material.

Further, the number of the head units 3 provided in the printing apparatus 1 and the number of the nozzle blocks 31 provided in the printing head 30 may be changed as appropriate. According to this, the number of the maintenance parts 50 and the number and arrangement of the caps 53 provided in the maintenance part 50 can be changed as appropriate. Further, although the plurality of head units 3 are disposed to have different inclinations in the above embodiment, the invention functions as a matter of course also when the inclinations are the same.

Further, the "base material" serving as an object to be printed is also not limited to the web, which is a continuous sheet, as described above and may be a single recording sheet. Further, a mode of conveyance of the base material is not limited to conveyance by rollers and another conveyance method, e.g., belt conveyance, may be adopted.

As the specific embodiment has been illustrated and described above, the conveying mechanism may be, for example, configured to include conveyor rollers for defining a conveyance path by coming into contact with the base material and a roller supporting member for rotatably supporting the conveyor rollers, and the cleaning member may move further outward than the roller supporting member when the printing head is moved from the inside position to the outside position in the printing apparatus according to the invention. By moving the cleaning member further outward than the rollers constituting the conveyance path and the supporting member for those, an effect of improving maintenance operability for the cleaning member becomes more reliable.

Further, for example, a relative moving direction of the maintenance part with respect to the printing head by a relative moving mechanism may be a direction parallel to the second direction and opposite to a moving direction of the printing head when the printing head moves from the inside position toward the outside position. By configuring the maintenance part to move in the direction opposite to the moving direction of the printing head toward the outside of the housing, a relative movement is easily realized in the housing.

In this case, the cleaning member can be arranged, when viewed from the printing head, in a moving direction that the printing head moves from the outside position toward the inside position. That is, the cleaning member can be located on a back side of the printing head when the inside of the housing is viewed from the outside of the housing. According to such a configuration, the cleaning member is arranged in an advancing direction when the maintenance part below the printing head relatively moves with respect to the printing head. Thus, a relative movement for maintenance itself serves as the cleaning operation for the caps and the wipers. Therefore, every time the maintenance part operates, cleaning can be performed.

Further, for example, the cleaning member can be a porous member formed of an elastic material. More specifically, the cleaning member can be a porous member rotatably supported and having a roller shape. By bringing such a cleaning member into contact with an object to be cleaned, cleaning can be effectively performed by rubbing a surface of the object to be cleaned.

Further, for example, a head supporting member for supporting the printing head by being supported movably in the second direction by the supporting mechanism can be further provided, and the cleaning member can be mounted on the head supporting member. According to such a configuration, when the head supporting member moves in the second direction, both the printing head and the cleaning member integrally move according to such a movement. That is, the cleaning member can be simultaneously pulled out to outside by an operation of moving the printing head to the outside position.

In this case, out of the supporting member, a space below the cleaning member is more preferably open. According to such a configuration, a maintenance operation can be performed by easily accessing the exposed cleaning member from below.

Further, the head supporting member may support the printing head via the elevating mechanism and the elevating mechanism may move the printing head up and down. According to such a configuration, by moving the printing head up and down, a switch can be made between a state where the printing head is arranged to closely face the base material in the housing and a state where the printing head is moved upward away from the base material. Thus, a space for arranging the maintenance part can be secured between the printing head and the base material. Further, the printing head can be prevented from interfering with the base material when being pulled out.

Further, for example, the printing head, the maintenance part, the relative moving mechanism and the head supporting member may be integrally supported by the supporting mechanism. According to such a configuration, when the printing head is pulled out to the outside position, the maintenance part, the relative moving mechanism and the head supporting member are also pulled out as one unit. In this way, the operability of the maintenance operation for each of these components can be further improved.

Further, for example, an opening provided with an openable and closable door may be provided in a part of the housing. In this case, the supporting mechanism may be configured to expose the printing head from the internal space via the opening. According to such a configuration, the printing head can be normally isolated from the outside space by the door, whereas the printing head can be pulled out to outside via the opening when necessary. Thus, the protection of the printing head during normal time and the operability of the maintenance operation can be combined.

The invention is applicable to techniques in general for performing maintenance for an ink discharge head. Particularly, the invention is suitably applied to a printing apparatus provided with a cleaning member for cleaning a cap for covering a discharge port and a wiper for wiping the discharge port or at least one of these.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus, comprising:

a conveying mechanism which conveys a base material;

a printing head which is arranged above the base material being conveyed in a first direction along a predetermined conveyance path by the conveying mechanism, faces a surface of the base material from above and discharges an ink toward the surface of the base material from a discharge port provided in a lower part;

a supporting mechanism which supports the printing head movably in a second direction which is horizontal and intersecting the first direction;

a maintenance part which is provided below the printing head and includes a wiper for wiping off the ink adhering to the discharge port and a cap for covering the discharge port;

a housing which accommodates the printing head and at least a part of the conveying mechanism in an internal space;

a relative moving mechanism which relatively moves the maintenance part in a horizontal direction with respect to the printing head along a lower surface of the printing head in the internal space, thereby realizes a contact of the wiper with the discharge port and positioning of the cap with respect to the discharge port; and a cleaning member which cleans at least one of an upper end of the wiper and an upper end of the cap as an object to be cleaned, wherein:

a movable range in the second direction of the printing head by the supporting mechanism includes an inside position where the printing head is located above the base material in the internal space and an outside position where at least a part of the printing head is exposed to outside from the internal space; and the cleaning member is integrated with the printing head in a relative movement by the relative moving mechanism and arranged to at least partially overlap a movement path of the object to be cleaned with respect to the printing head and moves to outside the conveyance path integrally with the printing head when the printing head is moved from the inside position to the outside position.

2. The printing apparatus according to claim 1, wherein the conveying mechanism includes:

conveyor rollers which define the conveyance path by coming into contact with the base material; and a roller supporting member which rotatably supports the conveyor rollers, and wherein the cleaning member moves further outward than the roller supporting member when the printing head is moved from the inside position to the outside position.

3. The printing apparatus according to claim 1, wherein a relative moving direction of the maintenance part with respect to the printing head by the relative moving mechanism is a direction parallel to the second direction and opposite to a moving direction of the printing head when the printing head moves from the inside position to the outside position.

4. The printing apparatus according to claim 3, wherein the cleaning member is arranged, when viewed from the printing head, in a direction that the printing head moves from the outside position to the inside position.

5. The printing apparatus according to claim 1, wherein the cleaning member is a porous member formed of an elastic material.

6. The printing apparatus according to claim 5, wherein the porous member is rotatably supported and has a roller shape.

7. The printing apparatus according to claim 1, further comprising a head supporting member which is supported movably in the second direction by the supporting mechanism and supports the printing head, wherein the cleaning member is mounted on the head supporting member.

8. The printing apparatus according to claim 7, wherein out of the head supporting member, a space below the cleaning member is open.

9. The printing apparatus according to claim 7, wherein the head supporting member supports the printing head via an elevating mechanism and the elevating mechanism moves the printing head up and down.

10. The printing apparatus according to claim 7, wherein the printing head, the maintenance part, the relative moving mechanism and the head supporting member are integrally supported by the supporting mechanism.

11. The printing apparatus according to claim 1, wherein an opening is provided with an openable and closable door in a part of the housing, and the supporting mechanism exposes the printing head from the internal space via the opening.

* * * * *